US012594817B2

(12) United States Patent
Fournier et al.

(10) Patent No.: US 12,594,817 B2
(45) Date of Patent: Apr. 7, 2026

(54) FLUID-HEATING DEVICE, IN PARTICULAR FOR A VEHICLE

(71) Applicant: Valeo Systemes Thermiques, Le Mesnil Saint-Denis (FR)

(72) Inventors: Jonathan Fournier, Le Mesnil Saint-Denis (FR); Laurent Decool, Le Mesnil Saint-Denis (FR); Arnaud Faivre, Le Mesnil Saint-Denis (FR); Serif Karaaslan, Le Mesnil Saint-Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 904 days.

(21) Appl. No.: 17/782,274

(22) PCT Filed: Nov. 19, 2020

(86) PCT No.: PCT/FR2020/052136
§ 371 (c)(1),
(2) Date: Jun. 3, 2022

(87) PCT Pub. No.: WO2021/111056
PCT Pub. Date: Jun. 10, 2021

(65) Prior Publication Data
US 2023/0012887 A1     Jan. 19, 2023

(30) Foreign Application Priority Data
Dec. 5, 2019    (FR) ........................................ 1913826

(51) Int. Cl.
*B60H 1/22*          (2006.01)
(52) U.S. Cl.
CPC ......... *B60H 1/2221* (2013.01); *B60H 1/2218* (2013.01); *B60H 2001/2278* (2013.01)

(58) Field of Classification Search
USPC ...................................................... 237/12.3 R
See application file for complete search history.

(56) References Cited

U.S. PATENT DOCUMENTS 6,467,282 B1 * 10/2002 French .................. F25D 21/006
                                                    62/151
2009/0008464 A1    1/2009  Gerhardt et al.
(Continued)

FOREIGN PATENT DOCUMENTS

CN          102322341  A      1/2012
CN          207230650  U      4/2018
(Continued)

OTHER PUBLICATIONS

Notification of Reason for Rejection in corresponding Japanese Application No. 2022-533549, dated Jul. 4, 2023 (8 pages).
(Continued)

*Primary Examiner* — Steven B McAllister
*Assistant Examiner* — John E Bargero
(74) *Attorney, Agent, or Firm* — Osha Bergman Watanabe & Burton LLP

(57)                   ABSTRACT

The present invention relates to an electric fluid-heating device (1), in particular for a motor vehicle, comprising a housing having a first fluid-circulation chamber (21), at least one electric heating element (4) for heating the fluid in said first chamber (21), an electronic board (81) for controlling a current circulating in said electric heating element or elements (4), at least one thermal sensor. Said device is characterised in that the thermal sensor or sensors are positioned on the electronic board (81) and thermally connected to the first chamber (21) via a heat sink (9).

7 Claims, 3 Drawing Sheets

(56) References Cited

U.S. PATENT DOCUMENTS

| | | | |
|---|---|---|---|
| 2016/0295681 A1 | 10/2016 | Yamamoto | |
| 2017/0313160 A1 | 11/2017 | Eckert et al. | |
| 2024/0418403 A1* | 12/2024 | Chae ....................... | F24H 1/121 |

FOREIGN PATENT DOCUMENTS

| | | | | |
|---|---|---|---|---|
| CN | 110268206 A | | 9/2019 | |
| EP | 2104016 A1 | | 9/2009 | |
| JP | 2007263636 A | * | 10/2007 | |
| JP | 2009-512582 A | | 3/2009 | |
| JP | 2016-197078 A | | 11/2016 | |
| JP | 2017-531588 A | | 10/2017 | |
| WO | 2014033115 A2 | | 3/2014 | |
| WO | 2015082434 A1 | | 6/2015 | |

OTHER PUBLICATIONS

Office Action in corresponding Chinese Application No. 202080092096. 2, dated May 31, 2023 (8 pages).

* cited by examiner

FLUID-HEATING DEVICE, IN PARTICULAR FOR A VEHICLE

The invention relates to a fluid heating device, in particular intended for a vehicle, more particularly for an installation for ventilating, heating and/or air conditioning the vehicle interior and/or the thermal regulation of a battery. It may be in particular an electric or hybrid vehicle that is able to be autonomous.

It is known to heat the air intended for the thermal treatment of a vehicle interior by the exchange of heat between an air flow and a heat transfer liquid, using a heat exchanger. In the case of hybrid or electric vehicles, electric heating devices that form a source of heat energy and in which an electric current is circulated to raise the temperature of electric heating elements placed in contact with the heat transfer liquid are known. Heat energy is then exchanged between the heating elements and the heat transfer liquid, which in turn heats up before heating the car interior by virtue of the exchanger.

To control the electric current used to supply power to the electric heating elements, it is necessary to have sensors that give information relating to the temperature of the fluid.

The locations used up to now to position these sensors are not entirely satisfactory.

It is therefore necessary to find a temperature recording solution which has a simple design, can be positioned easily in a fluid heating device, and is able to give a reliable picture of the temperature of the fluid and to interact with a control circuit of the electric heating elements.

The present invention aims to propose a temperature recording solution having at least one of the above features.

To that end, the subject of the invention is an electric fluid heating device, in particular for a motor vehicle, comprising a housing having a first chamber for circulation of the fluid, at least one electric heating element for heating the fluid in said first chamber, an electronic circuit board for controlling a current circulating in said electric heating element(s), and at least one thermal sensor. According to the invention, the thermal sensor(s) are positioned at the electronic circuit board and thermally connected to said first chamber via a heat sink.

The heat sink according to the invention allows the sensors to access the temperature of the first chamber of the housing without being placed directly in contact with it. In particular, the heat sink allows the sensors to access the temperature of the electric heating elements and/or of the heat transfer fluid that are present in said first chamber on the basis of recording the temperature of a wall of said first chamber. For the electric heating elements and for the heat transfer fluid, this involves indirectly recording the temperature, this being made possible by virtue of a known correspondence or a known correlation with the temperature of the chosen zone of the first chamber.

Furthermore, the heat sink according to the invention may be formed at least in part while the housing is being die cast. This makes it simpler to manufacture the temperature recording solution.

The invention may also comprise any one of the following features, taken individually or in any technically possible combination forming as many embodiments of the invention:

the electric heating element(s) are arranged in the first chamber in contact with the fluid;

the heat sink is in contact with the electronic circuit board;

the heat sink is positioned close to a fluid outlet opening of the housing, in particular an outlet opening of the first chamber;

the electronic circuit board comprises a main zone and a zone thermally insulated from said main zone;

the insulated zone is defined by through-slots formed on the electronic circuit board;

the insulated zone accommodates the temperature sensor(s);

the insulated zone is positioned close to the heat sink;

the electronic circuit board is positioned in the second chamber of the housing;

the second chamber is separated from the first chamber by means of a separating wall;

the heat sink comprises a column;

the column is formed in the second chamber;

the column extends from the separating wall;

the column is in contact with the electronic circuit board;

the column supports the electronic circuit board;

the column has a conical shape;

the column has a bore;

the column has a periphery provided with stiffening fins;

an element fixes the electronic circuit board on the column;

the fixing element and/or the column earth the electronic circuit board on the housing;

the fixing element comprises a head and a shank;

the shank of the fixing element passes through an opening in the electronic circuit board and extends into the bore of the column;

the head of the fixing element presses the electronic circuit board against the column;

the fixing element is formed by a screw.

The invention will be better understood and further details, features and advantages of the invention will become apparent from reading the following description given by way of non-limiting example and with reference to the appended drawings, in which.

It should first of all be noted that, in all of the figures, elements that are similar and/or perform the same function are indicated by the same reference.

By convention, unless stated otherwise, the term "longitudinal" applies to the direction in which the largest dimension of the electric heating device extends, the term "transverse" applies to a direction substantially perpendicular to the longitudinal direction, and the term "vertical" refers to the direction perpendicular both to the longitudinal direction and to the transverse direction.

Furthermore, with reference to the orientations and directions defined above, the longitudinal direction will be represented by the axis Ox, the transverse direction will be represented by the axis Oy, and the vertical direction will be represented by the axis Oz. These various axes together define an orthonormal reference system Oxyz shown in FIGS. 1 and 2. Within this reference system, the terms "top" or "upper" will be represented by the positive direction of the axis Oz, the terms "bottom" or "lower" being represented by the negative direction of this same axis Oz.

Figure 1:
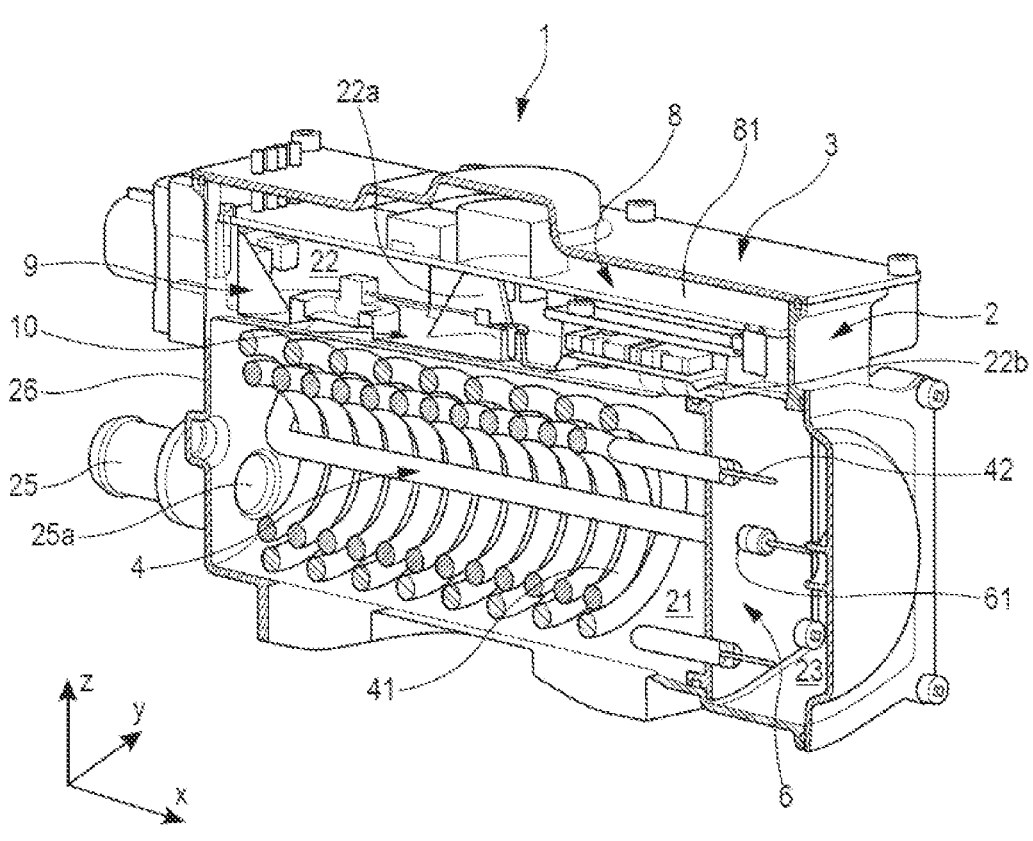
FIG. 1 is a longitudinal sectional view of a heating device according to the invention.

As is illustrated in FIG. 1, the invention relates to a heating device 1. Said device is used for heating a fluid, in particular a heat transfer liquid. Said device comprises a housing 2 for circulation of the fluid, at least one heating element 4, two in this instance, and a control unit 8 for controlling a supply current to said heating element(s).

In particular, the housing 2 defines a first chamber 21 for circulation of the fluid, which first chamber is arranged so as to accommodate the electrical heating element(s) 4 such that the fluid circulating in said housing is brought into contact with said electric heating element(s). The housing 2 also defines a second chamber 22 in which is housed the control unit 8 for controlling the current circulating in the electrical heating element(s) 4. Lastly, the housing defines a third chamber 23 which is separated from the first chamber 21 by means of a cover 6.

The housing 2 is formed, for example, by die-casting aluminum and/or an aluminum alloy.

To circulate the fluid in the chamber 21, the housing 2 comprises at least a first, inlet pipe (not shown) and at least a second, outlet pipe 25 in communication with said chamber 21. The inlet pipe and the outlet pipe 25 are arranged on one and the same side of the housing 2, in this instance at a bottom 26 of the housing 2.

The outlet pipe 25 leads directly into the chamber 21 through a first aperture 25a. The inlet pipe leads into the chamber 21 by way of a second aperture formed at one end of said chamber, opposite the bottom 26. The inlet pipe comprises a channel longitudinally bordering the chamber 21 and leading into said chamber.

Each electric heating element 4 comprises a shielded resistor 41 arranged in a spiral and also at least one connection terminal 42 intended to connect said resistor to a current supply source. Said electric heating elements 4 extend longitudinally in the housing 2 through the cover 6.

To this end, the cover 6 comprises openings 61 in which the electric heating elements 4 are mounted in such a way that, for each of said electric elements, the resistor 41 extends in the first chamber 21 and the terminals 42 extend through the cover 6 and lead into the third chamber 23. The connection between said cover 6 and said terminals 42 is leaktight.

Moreover, the cover 6 is mounted at the end of the chamber 21 in a leaktight manner, this being done by adhesive bonding, screwing, a force fit, or any other means and/or technique known to a person skilled in the art. It should be noted that the cover 6 is made for example from aluminum and/or an aluminum alloy.

The second chamber 22 is located above the first chamber 21, along the latter, and has an upper edge closed off by means of an upper covering 3. Furthermore, the second chamber 22 comprises vertical projections 22a and also a platform 22b that are formed on a separating wall 10 between said second chamber and the first chamber 21.

The control unit 8 comprises an electronic circuit board 81 positioned above the vertical projections 22a of the second chamber 22 and also at least one switch configured to control the amount of current and/or cut off the current circulating in the electric heating element(s) 4 to prevent overheating of the fluid and/or said electric heating element(s).

According to the invention, the heating device comprises one or more thermal sensors positioned on the electronic circuit board 81 and thermally connected to the first chamber 21 via a heat sink 9.

Figure 2:
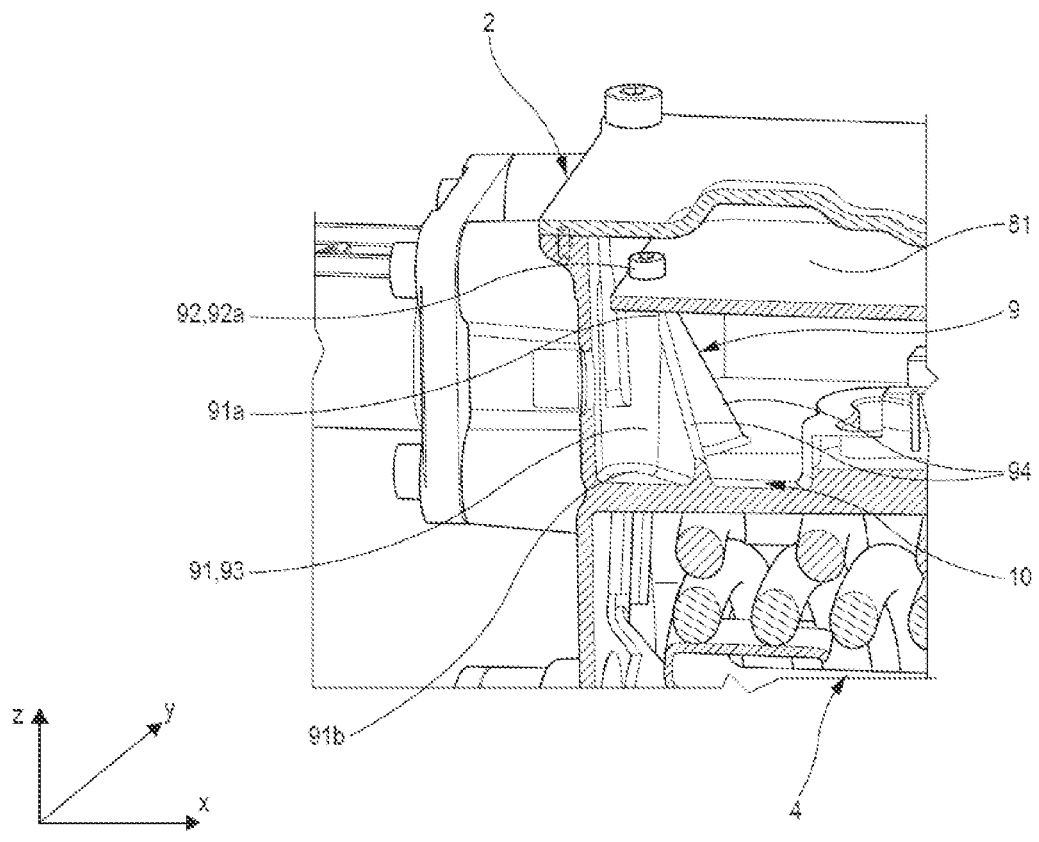
FIG. 2 shows a detail of FIG. 1.

As is illustrated in FIG. 2, the heat sink 9 comprises a column 91 which extends from the separating wall 10, and also a fixing element 92 which comprises a shank 92a connected to a head 92b.

In particular, the choice of the separating wall 10 as a bearing surface for the column 91 of the heat sink 9 is linked to the fact that said wall receives by conduction the heat of the fluid present in the first chamber 21, and consequently has a temperature corresponding to or in correlation with that of the fluid and/or of the electric heating elements 4.

The column 91 comprises a bore defined between an open upper edge 91a and a closed lower edge 91b and in contact with the separating wall 10. In addition, the column 91 comprises a periphery 93 provided with stiffening fins 94.

The fins 94, two in this instance, each have in a radial direction of the column 91 a triangular section of decreasing width between the lower edge 92b and the upper edge 92a of said column.

Thus, the column 91 and the fins 94 have a flared overall shape which offers the advantage of draining off almost all of the heat from the separating wall 10 toward the electronic circuit board 81, the large base of the column 91 and the base of the fins 94 being located in contact with the separating wall 10.

Advantageously, the column 91 and the fins 94 form a single body obtained while the housing 2 is being die cast.

Figure 3:
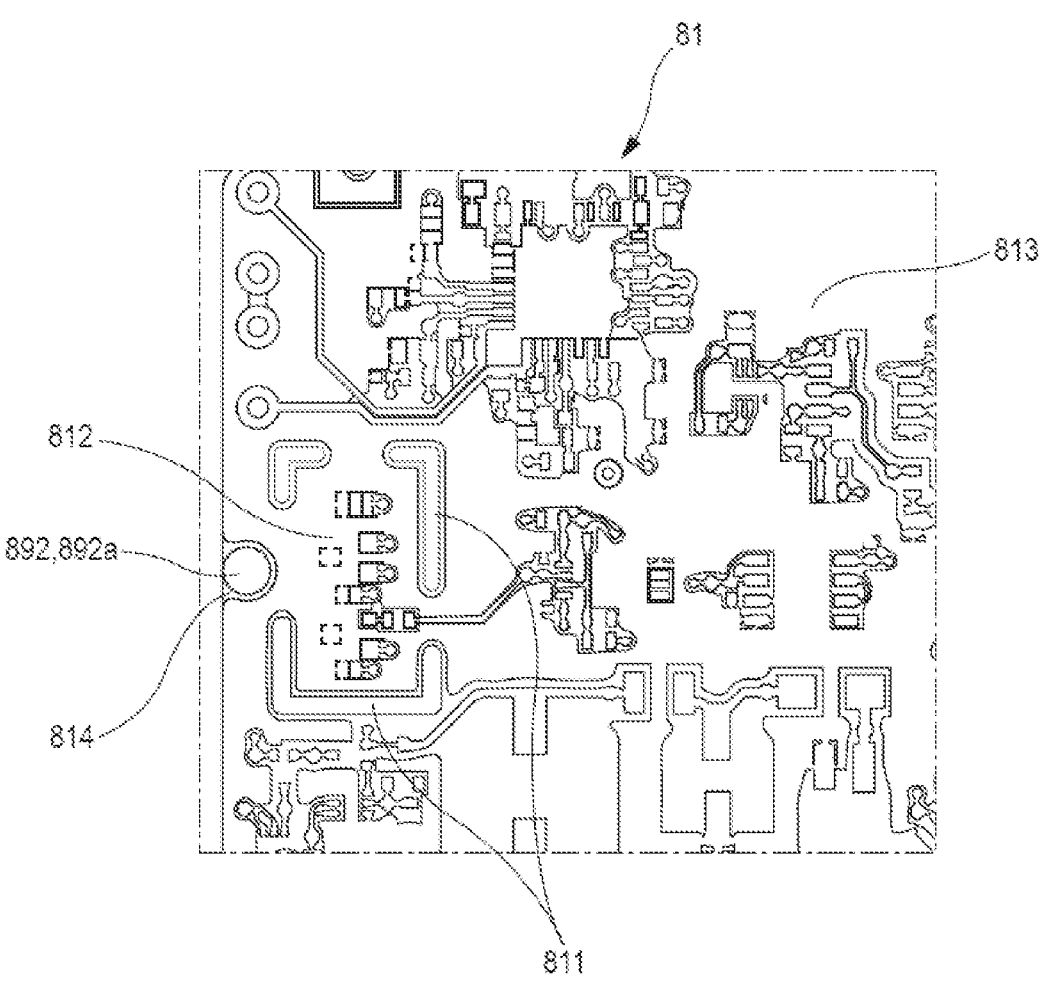
FIG. 3 shows the schematic structure of an electronic circuit board of a heating device according to the invention.

Advantageously, the column 91 and the fins 94 are formed by one of the projections 22a serving to position the electronic circuit board 81 above the platform 22b of the second chamber 22. This simplifies the design of the heating device 1 in that the heat sink function may be assigned to any of the projections 22a supporting the electronic circuit board 81. As is illustrated in FIG. 3, the electronic circuit board 81 has through-slots 811 which define a zone 812 thermally insulated from a main zone 813 of said circuit board, said insulated zone accommodating the thermal sensor(s).

In addition, the electronic circuit board 81 comprises, near the insulated zone 812, an opening 814 which is aligned with the bore of the column 91 in order to accommodate a shank of the fixing element 92. Said shank is provided with a head 92a which makes it possible to press the electronic circuit board 81 against the upper edge 91a of the column 91.

In other words, the heat sink 9, by way of interaction between the column 91 and the fixing element 92, makes it possible to fix the electronic circuit board 81 on the housing 2, at the same time earthing said electronic circuit board on said housing.

In addition, the heat sink 9, by way of the column 91 and/or the fixing element 92, establishes thermal contact between the separating wall 10 and the electronic circuit board 81, and more particularly between the separating wall 10 and the temperature sensors positioned on said electronic circuit board in the insulated zone 812.

Advantageously, the fixing element 92 is formed by a screw which interacts with a thread made in the bore of the column 91.

Advantageously, the heat sink 9 is positioned close to the fluid outlet opening 25a, a zone subject to high temperatures; and the insulated zone 812 of the electronic circuit board 81 is positioned vertically facing said sink.

The control unit 8 comprises, for example, a microcontroller, not shown, controlling the supply current to the electric heating elements, in particular by controlling the open or closed state of switches serving to supply power to said electric heating elements.

There are, for example, two or three thermal sensors which use different technologies to ensure redundancy and avoid common failure modes. The temperature information generated by these sensors is transmitted to the microcontroller for control of the current and/or detection of a safe temperature being exceeded.

The invention claimed is:

1. An electric fluid heating device for a motor vehicle, the electric fluid heating device comprising:

a housing comprising a first chamber configured to circulate a fluid and a separating wall;

at least one electric heating element configured to heat the fluid in the first chamber;

a controller comprising an electronic circuit board, wherein the controller is configured to control a current circulating in the at least one electric heating element; and at least one thermal sensor, wherein the at least one thermal sensor is positioned at the electronic circuit board arranged within the housing and thermally connected to the first chamber via a heat sink arranged within the housing, wherein the electronic circuit board is arranged in a second chamber of the housing, the second chamber being separated from the first chamber by the separating wall, wherein the heat sink comprises at least one column formed in the second chamber and extending from the separating wall, the at least one column being in contact with the electronic circuit board, and wherein the at least one column supports the electronic circuit board.

2. The electric fluid heating device as claimed in claim 1, wherein the heat sink is positioned closer to a fluid outlet opening at a bottom of the housing than the electronic circuit board.

3. The electric fluid heating device as claimed in claim 1, wherein the electronic circuit board comprises a main zone and an insulated zone configured to accommodate at least one temperature sensor.

4. The electric fluid heating device as claimed in claim 3, wherein the insulated zone is defined by through-slots formed on the electronic circuit board.

5. The electric fluid heating device as claimed in claim 1, further comprising an element ensuring that the electronic circuit board is fixed on the at least one column, the element being mounted through the electronic circuit board.

6. The electric fluid heating device as claimed in claim 1, wherein the at least one column and/or a fixing element grounds the electronic circuit board on the housing.

7. The electric fluid heating device as claimed in claim 1, wherein a fixing element has a head which is positioned close to the at least one thermal sensor, and a shank which engages in a bore of the at least one column.

* * * * *